(12) United States Patent
Shinohara (10) Patent No.: US 12,028,631 B2
(45) Date of Patent: Jul. 2, 2024

(54) PHOTOELECTRIC CONVERSION APPARATUS

(71) Applicant: CANON KABUSHIKI KAISHA, Tokyo (JP)

(72) Inventor: Mahito Shinohara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/341,850

(22) Filed: Jun. 27, 2023

(65) Prior Publication Data

US 2023/0421919 A1    Dec. 28, 2023

(30) Foreign Application Priority Data

Jun. 28, 2022  (JP) .................. 2022-103904

(51) Int. Cl.
*H04N 25/67*  (2023.01)
*H04N 25/671*  (2023.01)
*H04N 25/77*  (2023.01)

(52) U.S. Cl.
CPC ........... *H04N 25/671* (2023.01); *H04N 25/77* (2023.01)

(58) Field of Classification Search
CPC ..... H04N 25/671; H04N 25/77; H04N 25/773
See application file for complete search history.

(56) References Cited

U.S. PATENT DOCUMENTS

| | | | |
|---|---|---|---|
| 7,394,492 B2 | 7/2008 | Shinohara |
| 7,741,593 B2 | 6/2010 | Iwata |
| 7,821,551 B2 | 10/2010 | Shinohara |
| 7,884,870 B2 | 2/2011 | Shinohara |
| 8,139,133 B2 | 3/2012 | Iwane |
| 8,164,668 B2 | 4/2012 | Iida |
| 8,345,137 B2 | 1/2013 | Shinohara |
| 8,350,942 B2 | 1/2013 | Shinohara |
| 8,471,942 B2 | 6/2013 | Shinohara |
| 8,896,734 B2 | 11/2014 | Shinohara |
| 8,970,769 B2 | 3/2015 | Shinohara |
| 9,437,647 B2 | 9/2016 | Shinohara |
| 10,535,688 B2 | 1/2020 | Onuki |
| 10,714,515 B2 | 7/2020 | Shinohara |
| 10,771,720 B2 | 9/2020 | Shinohara |
| 10,818,724 B2 | 10/2020 | Shinohara |
| 10,944,931 B2 | 3/2021 | Shinohara |
| 11,056,520 B2 | 7/2021 | Onuki |
| 11,503,234 B2 | 11/2022 | Shinohara |

(Continued)

FOREIGN PATENT DOCUMENTS

| | | |
|---|---|---|
| JP | 2021-089962 A | 6/2021 |
| WO | 2022/064867 A1 | 3/2022 |

*Primary Examiner* — Tony Ko
(74) *Attorney, Agent, or Firm* — Venable LLP (57) ABSTRACT

A photoelectric conversion apparatus in which a plurality of pixels are arranged is provided. Each of the plurality of pixels includes an avalanche photodiode arranged between a first potential supply line and a second potential supply line, a first transistor arranged so as to form a current path between the first potential supply line and the avalanche photodiode, and a holding circuit configured to, when avalanche breakdown of the avalanche photodiode has occurred, hold a second potential corresponding a first potential of an electrode of the avalanche photodiode connected to the first transistor. The second potential is supplied to a gate of the first transistor from the holding circuit.

15 Claims, 9 Drawing Sheets

(56) References Cited

U.S. PATENT DOCUMENTS

| | | |
|---|---|---|
| 11,553,149 B2 | 1/2023 | Shinohara |
| 11,626,431 B2 | 4/2023 | Shinohara |
| 11,728,358 B2 | 8/2023 | Shinohara |
| 2019/0302242 A1* | 10/2019 | Fenigstein ............ H01L 31/107 |
| 2020/0382726 A1 | 12/2020 | Inaoka et al. |
| 2023/0038959 A1 | 2/2023 | Sekine |

* cited by examiner

PHOTOELECTRIC CONVERSION APPARATUS

BACKGROUND OF THE INVENTION

Field of the Invention

The present invention relates to a photoelectric conversion apparatus.

Description of the Related Art

A photoelectric conversion apparatus is known in which each pixel is provided with a single photon avalanche photodiode (SPAD) element capable of detecting weak light at the single photon level. Japanese Patent Laid-Open No. 2021-089962 describes a light receiving apparatus in which a SPAD element is arranged in each of a plurality of pixels. In the SPAD element, a voltage obtained by adding an excess voltage to the breakdown voltage of an avalanche photodiode (APD) is applied to the APD. When the breakdown voltage of the APD varies among the pixels, if the same voltage is applied to the APDs of the respective pixels, the value of the excess voltage supplied to the APD varies among the pixels. If the excess voltage varies among the pixels, the uniformity of characteristics in the respective pixels cannot be maintained. Japanese Patent Laid-Open No. 2021-089962 describes that a signal processing unit detects a signal output from an APD, and the detection result is fed back to a bias regulation unit to regulate the voltage value of the excess voltage.

SUMMARY OF THE INVENTION

With the configuration described in Japanese Patent Laid-Open No. 2021-089962, the signal processing unit detects the dead time in which the SPAD element cannot react to a photon. Thus, the circuit scale increases.

Some embodiments of the present invention provide a technique advantageous in ensuring the uniformity of characteristics among pixels.

According to some embodiments, a photoelectric conversion apparatus in which a plurality of pixels are arranged, wherein each of the plurality of pixels comprises: an avalanche photodiode arranged between a first potential supply line and a second potential supply line; a first transistor arranged so as to form a current path between the first potential supply line and the avalanche photodiode; and a holding circuit configured to, when avalanche breakdown of the avalanche photodiode has occurred, hold a second potential corresponding a first potential of an electrode of the avalanche photodiode connected to the first transistor, and the second potential is supplied to a gate of the first transistor from the holding circuit, is provided.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

With reference to FIGS. 1 to 9, a photoelectric conversion apparatus according to each embodiment of the present disclosure will be described. In the following embodiment, signal carriers are electrons, and a single photon avalanche photodiode (to be sometimes referred to as an SPAD hereinafter) element that detects potential change of the cathode of an avalanche photodiode (to be sometimes referred to as an APD hereinafter) caused by an avalanche current generated upon avalanche breakdown of the APD will be described. However, holes may be the signal carrier, and potential change of the anode of the APD may be detected.

In the embodiment, a potential corresponding to the potential of the cathode of the APD after detection of an avalanche current flowing upon avalanche breakdown of the APD is held, and a potential obtained by adding a predetermined voltage to the held potential is supplied to the APD. The potential of the cathode after detection of the avalanche current corresponds to a breakdown voltage Vbd of the APD in the anode potential reference, and the predetermined voltage to be added corresponds to an excess voltage Vex. In this case, each of a circuit that holds the potential corresponding to the potential of the cathode of the APD and a circuit that supplies the potential to the APD is basically a transistor circuit including a MOS (MIS) transistor. Assume that the variation in a threshold voltage Vth of the transistors forming the transistor circuit is sufficiently smaller than the variation in the breakdown voltage Vbd of the APD (Vbd>Vth). If Vbd variation is generally the same as that of Vth, the cause of the problem of the variation in the excess voltage Vex is simply replaced by t the variation in the threshold voltage Vth of the transistor. However, depending on the conditions under which the transistors are formed, the variation in the threshold voltage Vth of the transistor can be reduced to about ⅓ to ¼ of the variation in the breakdown voltage Vbd of the APD. That is, the premise for establishment of the present disclosure described below is sufficiently realistic.

Figure 1:
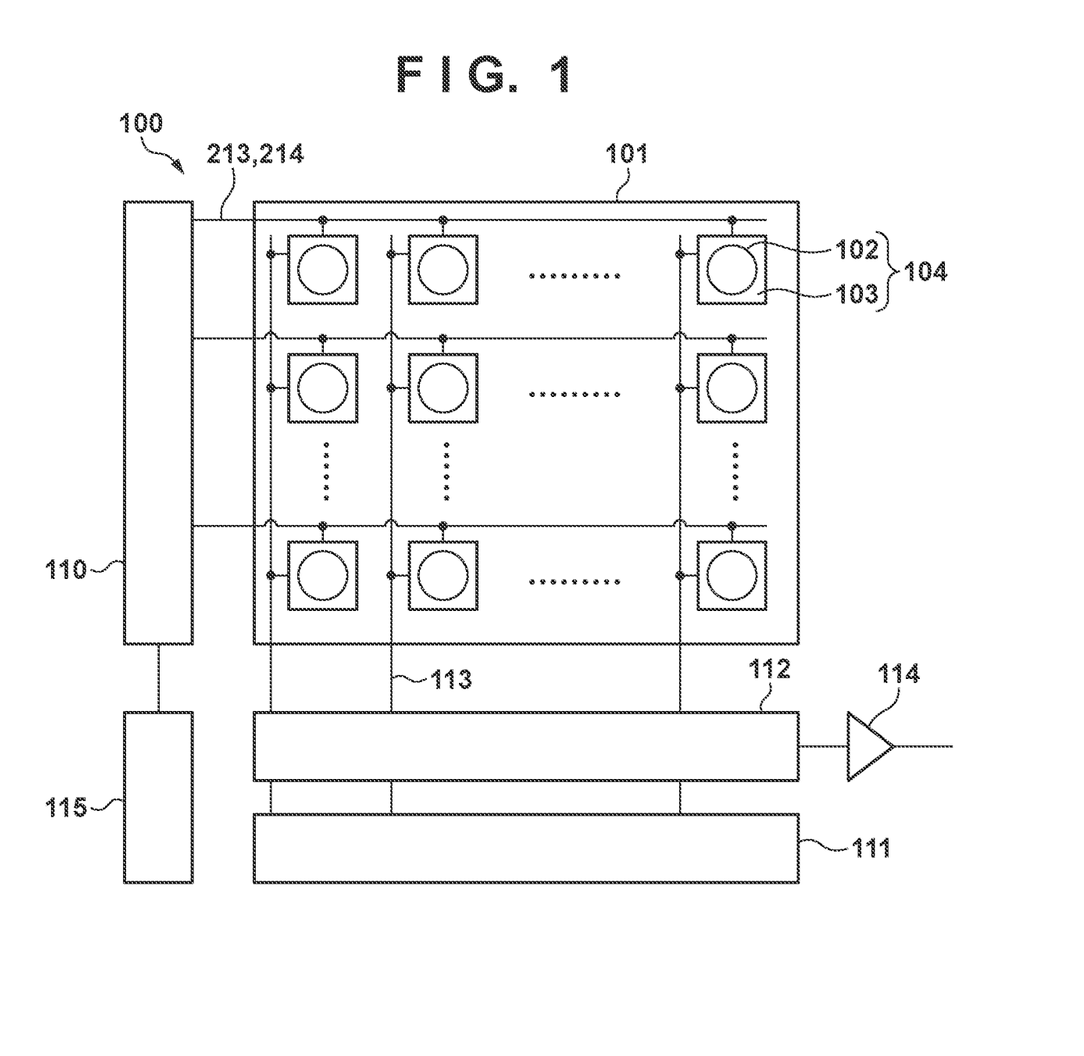
FIG. 1 is a view showing an arrangement example of a photoelectric conversion apparatus according to an embodiment.

FIG. 1 is a block diagram showing an arrangement example of a photoelectric conversion apparatus 100 according to the first embodiment of the present disclosure. The photoelectric conversion apparatus 100 includes a pixel unit 101, a control pulse generation circuit 115, a horizontal scanning circuit 111, a readout circuit 112, signal lines 113, and a vertical scanning circuit 110. A plurality of pixels 104 are arranged in a matrix in the pixel unit 101. Each pixel 104 includes a photoelectric conversion unit 102 including an APD and a signal processing circuit 103. The photoelectric conversion unit 102 convers light in the pixel 104 into an electrical signal. The signal processing circuit 103 outputs, to the readout circuit 112, the electrical signal generated by the photoelectric conversion unit 102 in accordance with the incident light.

In accordance with a pulse signal supplied from the control pulse generation circuit 115, the vertical scanning circuit 110 supplies a control pulse to each pixel 104. A logic circuit such as a shift register or an address decoder can be used for the vertical scanning circuit 110.

The signal output from the photoelectric conversion unit 102 of the pixel 104 is processed by the signal processing circuit 103. A counter, a memory, and the like may be arranged in the signal processing circuit 103, and the memory may hold a digital value counted by the counter.

In order to read out the signal from the memory of the pixel 104 holding the digital signal, the horizontal scanning circuit 111 inputs, to the signal processing circuit 103, a control pulse for sequentially selecting the pixels 104 for each column. The signal processing circuit 103 of the pixel 104 selected by the vertical scanning circuit 110 outputs the signal to the signal line 113. The signal output to the signal line 113 is output, via an output circuit 114, to a signal processing apparatus or the like arranged outside the photoelectric conversion apparatus 100, and can be, for example, displayed as a captured image on a display apparatus.

As shown in FIG. 1, the pixels 104 may be arranged in an array, but the present invention is not limited to this. For example, the pixels 104 may be arranged one-dimensionally (in a line). Further, the function of the signal processing circuit 103 is not necessarily provided for each of all the pixels 104. For example, one signal processing circuit 103 may be shared by the plurality of pixels 104, and sequentially perform signal processing.

Figure 2:
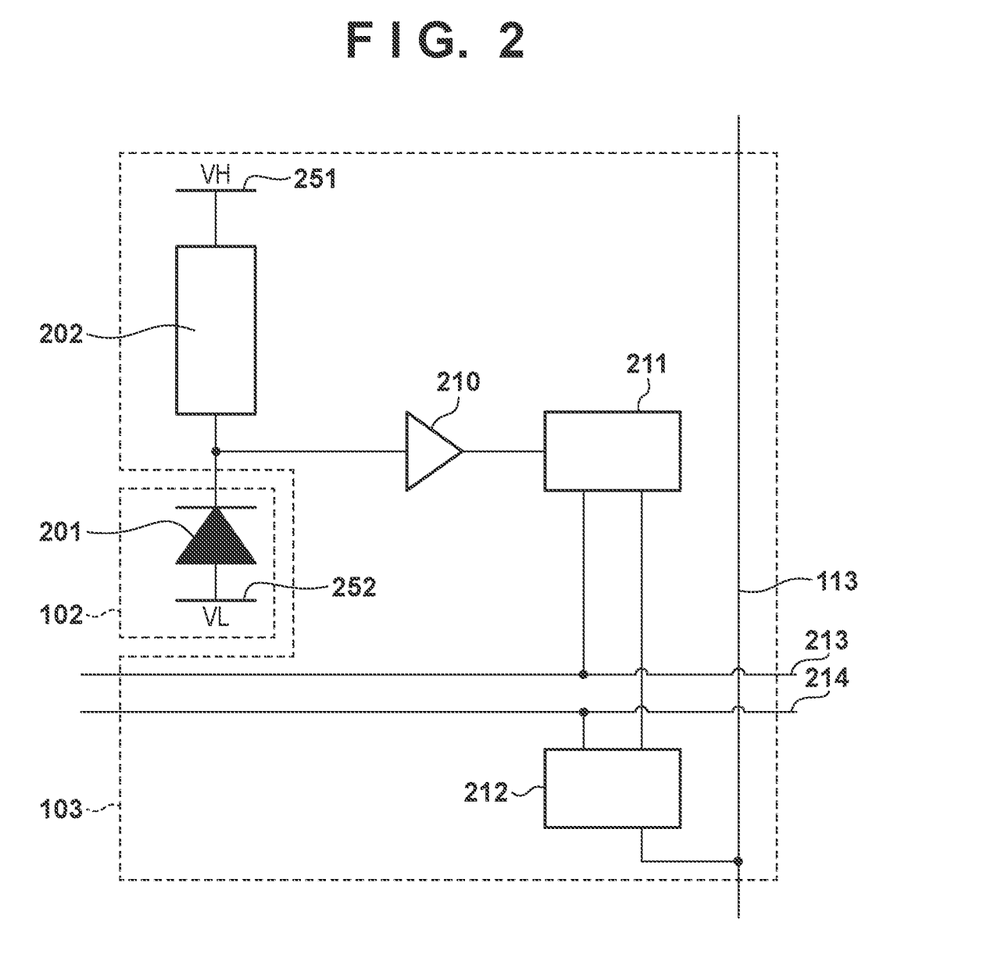
FIG. 2 is a view for explaining an arrangement example of a pixel arranged in the photoelectric conversion apparatus shown in FIG. 1.

FIG. 2 is a block diagram for explaining an arrangement example of the pixel 104 arranged in the photoelectric conversion apparatus 100. In the pixel 104, an avalanche photodiode (APD) 201 is arranged between a potential supply line 251 and a potential supply line 252. The APD 201 generates electric charge pairs corresponding to incident light. Voltage VL is supplied to the anode of the APD 201 from the potential supply line 252. Voltage VH higher than the voltage VL supplied to the anode is supplied to the cathode of the APD 201 from the potential supply line 251. A reverse bias voltage that causes the APD 201 to perform an avalanche breakdown operation is supplied between the anode and the cathode. By setting the state in which these voltages are supplied, electric charges generated by the incident light cause avalanche multiplication, thereby generating avalanche current.

In the operation of the APD 201, there are two modes of a Geiger mode, which is operated in a state in which the potential difference (voltage) between the anode and the cathode is larger than the breakdown voltage Vbd, and a linear mode, which is operated in a state in which the voltage between the anode and the cathode is around or smaller than the breakdown voltage. The APD operated in the SPAD device uses the Geiger mode. When the breakdown voltage Vbd of the APD 201 is 30 V, for example, the voltage VL is set to −30 V, and the voltage VH is set to 3 V.

The signal processing circuit 103 can include a waveform shaping circuit 210, a count circuit 211, and a selection circuit 212. The signal processing circuit 103 may also include a quenching element 202. The quenching element 202 is arranged between the APD 201 and the potential supply line 251 that supplies the voltage VH. The quenching element 202 has a function of converting avalanche current generated in the APD 201 to signal voltage. The quenching element 202 functions as a load circuit (quenching circuit) at the time of signal multiplication by avalanche breakdown, and serves to suppress avalanche breakdown by suppressing the voltage supplied to the APD 201 (quenching operation). The quenching element 202 may be, for example, a resistor element, and a transistor or the like.

The waveform shaping circuit 210 is connected to the node connected to the cathode or anode of the APD 201, and outputs a signal based on the potential of the electrode (cathode or anode) of the APD 201. In this embodiment, the waveform shaping circuit 210 outputs a pulse signal by shaping the potential change of the cathode of the APD 201 obtained when a photon enters the APD 201. This will be described later with reference to FIGS. 3A to 3C. As the waveform shaping circuit 210, for example, an inverter circuit is used. In the arrangement shown in FIG. 2, an example is shown in which one inverter is used as the waveform shaping circuit 210. However, for example, a circuit in which a plurality of inverters are connected in series may be used. Any circuit may be used as the waveform shaping circuit 210 as long as the circuit can shape a potential change of the APD 201 into a desired waveform.

The count circuit 211 can include a counter that counts the number of times the waveform shaping circuit 210 outputs the pulse signal, and a memory that holds the count value (number of times). If a control pulse is supplied from the vertical scanning circuit 110 via a drive line 213, the count value held by the count circuit 211 is reset.

The selection circuit 212 is supplied with a control pulse from the vertical scanning circuit 110 via a drive line 214, thereby switching an electric connection/disconnection between the count circuit 211 and the signal line 113. If the count circuit 211 and the signal line 113 are electrically connected, a count value is output from the count circuit 211 to the signal line 113. The selection circuit 212 may include, for example, a buffer circuit or the like for outputting a signal.

A switch element such as a transistor may be arranged between the quenching element 202 and the APD 201 or between the photoelectric conversion unit 102 and the signal processing circuit 103 to switch an electric connection. Similarly, supply of the voltage VH or the voltage VL supplied to the photoelectric conversion unit 102 may be electrically switched using a switch circuit such as a transistor.

In this embodiment, an arrangement in which the count circuit 211 is arranged in the signal processing circuit 103 is shown. However, the present invention is not limited to this. A Time to Digital Converter (TDC) and a memory may be used in place of the count circuit 211 to form the photoelectric conversion apparatus 100 that acquires a pulse detection timing. In this case, the generation timing of the pulse signal output from the waveform shaping circuit 210 is converted into a digital signal by the TDC. The TDC can be supplied with a control pulse (reference signal) from the vertical scanning circuit 110 via a drive line to measure the timing of the pulse signal. The TDC converts, with the control pulse as a reference, the relative input timing of the signal output from the APD 201 via the waveform shaping circuit 210 into a signal, thereby acquiring a digital signal.

Figure 3A:
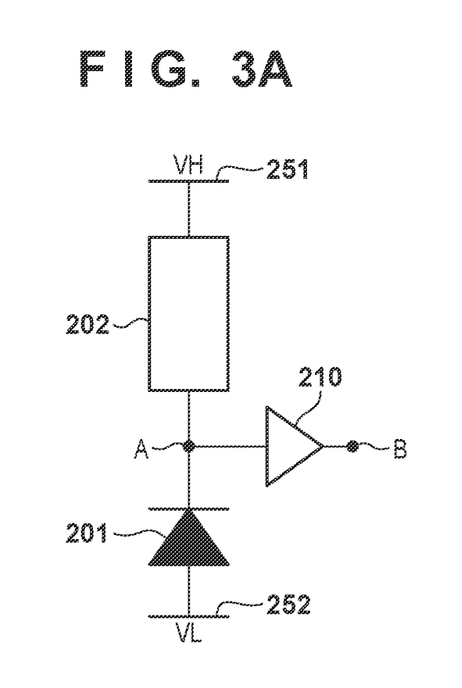
FIGS. 3A to 3C are views showing the signal waveforms at a node A and a node B of the pixel shown in FIG. 2.
Figure 3B:
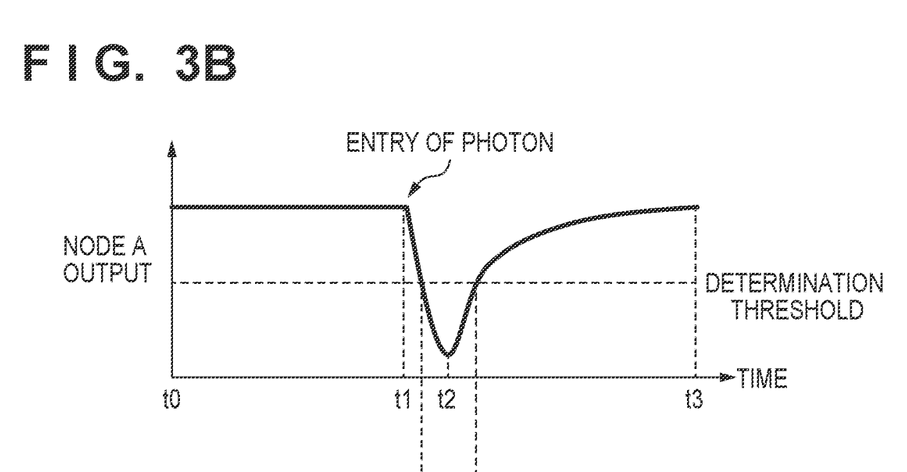
Figure 3C:
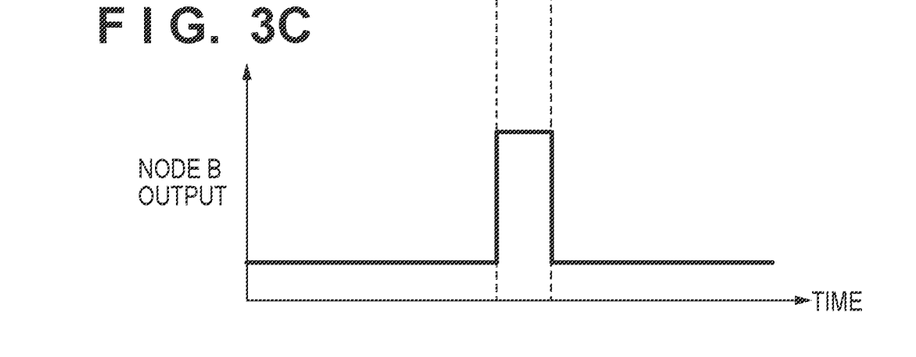

FIGS. 3A to 3C are views schematically showing the relationship between the operation of the APD 201 and the output signal of the waveform shaping circuit 210. As shown in FIG. 3A, the node representing the potential of the cathode of the electrodes of the APD 201 is indicated by a node A. Further, the node representing the potential of the output of the waveform shaping circuit 210 is indicated by a node B. FIGS. 3B and 3C show the waveform changes of the node A and the node B, respectively.

Between time t0 and time t1, a voltage (VH–VL) is applied to the APD 201. As shown in FIG. 3B, when a photon enters the APD 201 at time t1, an avalanche current flows through the quenching element 202, and the potential of the node A drops. When the drop amount of the potential of the node A further increases and the voltage applied to the APD 201 decreases, the avalanche breakdown of the APD 201 stops, and the potential level of the node A does not drop below a predetermined value (time t2). After that, charge-up current that compensates for the drop in potential flows from the potential supply line 251 to the node A, and the node A is stabilized at the original potential level at time t3. As shown in FIG. 3C, when avalanche breakdown of the APD 201 has occurred and the output waveform exceeds a predetermined threshold at the node A, the waveform shaping circuit 210 shapes the output waveform at the node A and outputs a signal (pulse signal) to the node B.

In the arrangement shown in FIG. 1, it is shown that the signal processing circuit 103 and the scanning circuits and the like around the pixel unit 101 are formed on the same semiconductor substrate as the APD 201. However, the present invention is not limited to this, and the signal processing circuit 103 and the scanning circuits and the like around the pixel unit 101 may be formed on a semiconductor substrate different from the pixel unit 101 in which the APD 201 is arranged. In this case, the substrate including the pixel unit 101 where the pixels 104 each including the APD 201 are arranged and the substrate where the signal processing circuit 103 and the like are arranged may be stacked.

Figure 4:
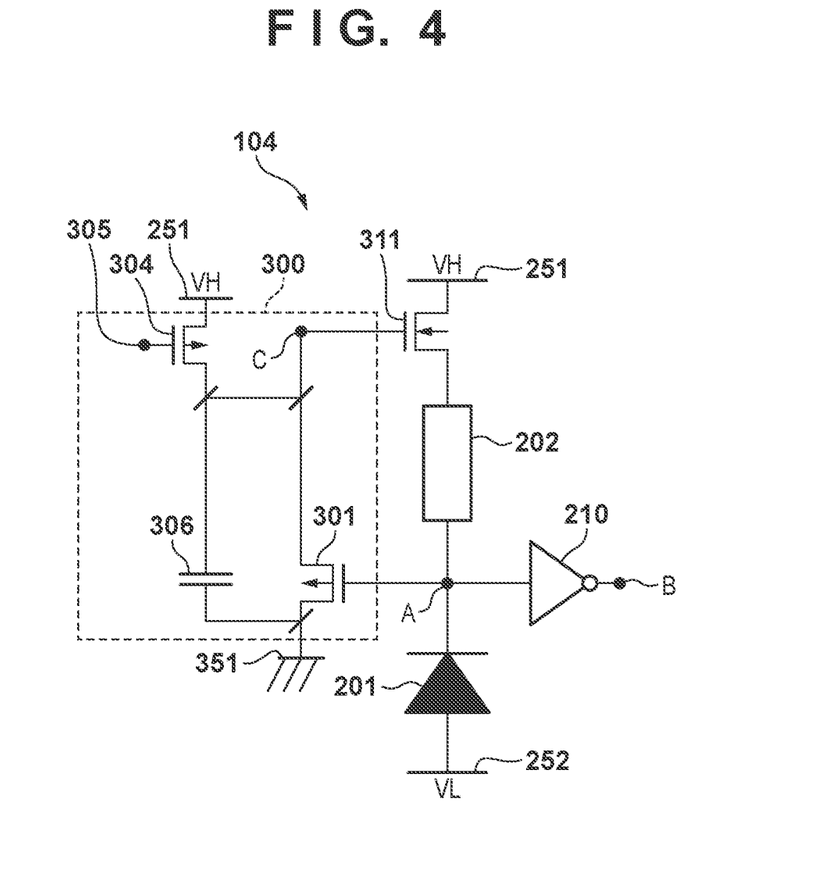
FIG. 4 is an equivalent circuit diagram showing an arrangement example of the pixel shown in FIG. 2.

FIG. 4 is an equivalent circuit diagram of the pixel 104 according to this embodiment. In FIG. 4, a portion up to the output (node B) of the waveform shaping circuit 210 of the signal processing circuit 103 is shown. As shown in FIG. 4, the pixel 104 includes a transistor 311 arranged so as to form a current path between the potential supply line 251 and the APD 201, and the holding circuit 300 that holds the potential corresponding to the potential of the cathode (node A), which is the electrode of the APD 201 connected to the transistor 311, when avalanche breakdown of the APD 201 has occurred. Here, when a transistor is arranged so as to form a current path between "A" and "B", "A" is connected to one main electrode of the transistor functioning as the source or the drain of the transistor, and "B" is connected to the other main electrode. "A" and "B" are not connected to the gate of the transistor.

As shown in FIG. 4, the holding circuit 300 includes a node C serving as a holding node configured to hold the potential corresponding to the potential of the node A and connected to the gate of the transistor 311, a transistor 304 for resetting the potential of the node C, and a transistor 301 arranged so as to form a current path between the node C and a potential supply line 351 and having the gate connected to the node A. The potential corresponding to the potential of the node A is supplied from the holding circuit 300 to the gate of the transistor 311.

In the arrangement shown in FIG. 4, the transistor 301 is a p-type MOS transistor, and the gate of the transistor 301 is connected to the node A, that is, the cathode of the APD 201. A ground potential is supplied to the potential supply line 351. A threshold voltage Vtp of the transistor 301 is negative. The transistor 311 is an n-type MOS transistor. A threshold voltage Vtn of the transistor 311 is positive. The transistor 304 is a p-type MOS transistor. The transistor 304 is arranged so as to form a current path between the potential supply line 251 and the node C serving as the holding node. The transistor 304 operates in accordance with a control pulse 305 input to the gate. The control pulse 305 may be supplied from the vertical scanning circuit 110, or a control circuit that supplies the control pulse 305 may be arranged in the photoelectric conversion apparatus 100. A hold capacitor 306 is connected to the node C. The hold capacitor 306 holds the potential corresponding to the potential of the node A. A capacitive element or the like may be intentionally arranged as the hold capacitor 306. Alternatively, the hold capacitor 306 may be the parasitic capacitance of a wiring pattern, the transistor 301 or 304, or the like. Further, in the arrangement shown in FIG. 4, the quenching element 202 is arranged between the transistor 311 and the APD 201.

Figure 5:
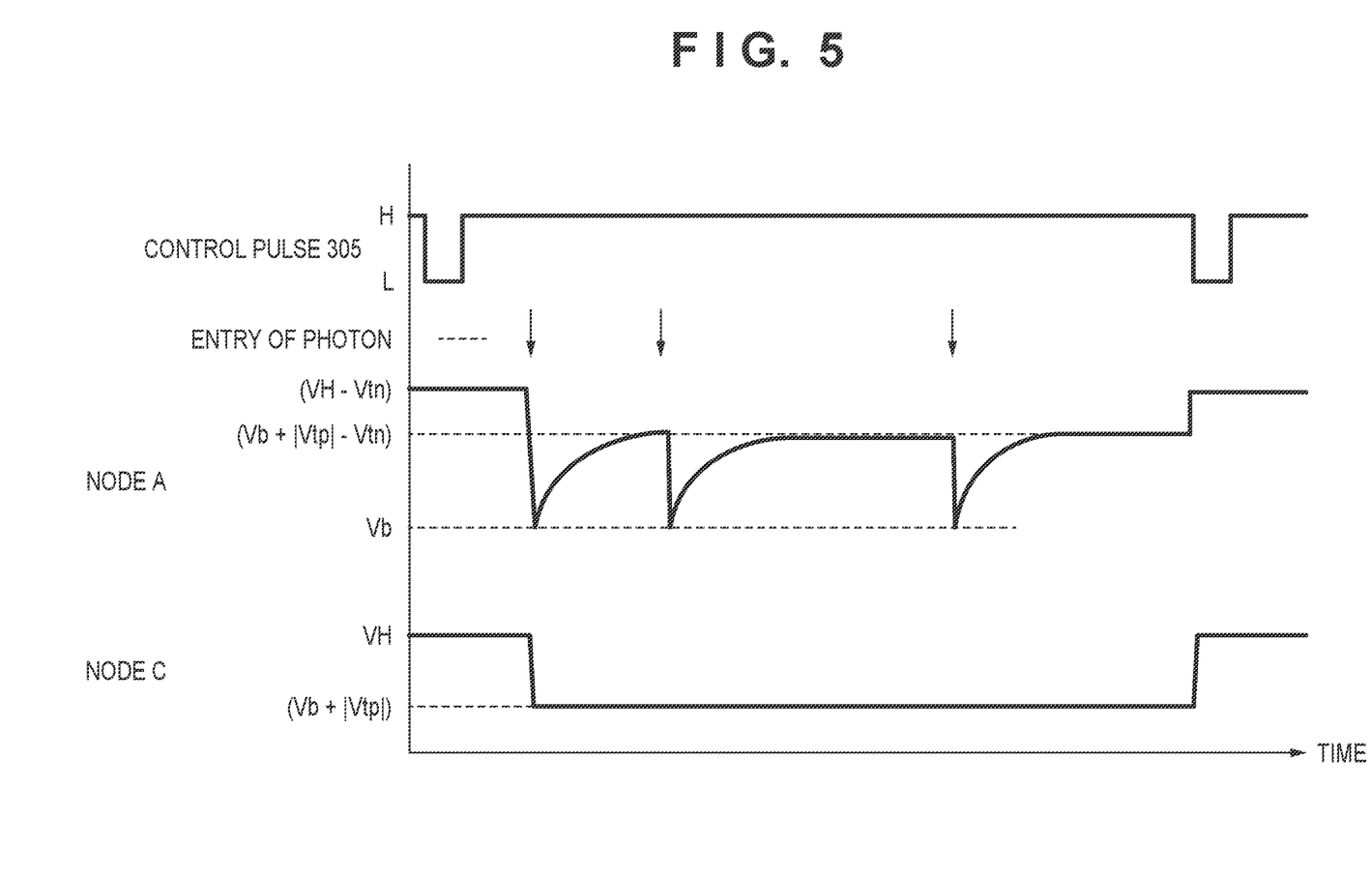
FIG. 5 is a timing chart showing an operation example of the pixel shown in FIG. 4.

FIG. 5 is a timing chart for explaining the operation of the pixel 104 shown in FIG. 4. FIG. 5 shows the waveform change of the control pulse 305 input to the gate of the transistor 304, the waveform change of the node A, and the waveform change of the node C. In FIG. 5, the timing at which a photon enters the APD 201 is indicated by "1,".

Before explaining the operation of the pixel 104, the voltage (potential) relationship among the components of the pixel 104 will be first described. The breakdown voltage Vbd of the APD 201 is 30 V and varies within a range of ±0.5 V. The excess voltage Vex is 2.0 V. In this case, for example, the voltage VL supplied to the potential supply line 252 is set to −30 V, and the voltage VH supplied to the potential supply line 251 is set to 3 V. Further, the threshold voltage Vtn of the transistor 311 is set to 0.2 V, and the threshold voltage Vtp of the transistor 301 is set to −2.2 V. That is, the threshold voltages Vtn and Vtp are set such that the difference between the absolute value of the threshold voltage Vtp of the transistor 301 and the threshold voltage Vtn of the transistor 311 is equal to the excess voltage Vex (Vex=|Vtp|−Vtn).

One control pulse 305 is input to the transistor 304 (in FIG. 5, the control pulse 305 is set at L level), for example, for each field, and the node C is reset to the voltage VH. In other words, it can be said that the interval at which the control pulse 305 is supplied decides the period of one field. While the control pulse 305 is being input, a reset operation is performed in which the node C serving as the holding node is reset to the voltage VH by the transistor 304. When the node C is reset, the potential of the gate of the transistor 311 becomes the voltage VH. Therefore, if a small amount of a drain current flows through the transistor 311, the source potential of the transistor 311, that is, the potential of the node A becomes a potential (VH−Vtn). In the example of the voltage (potential) relationship described above, the potential of the node A becomes 2.8 V. Even when the APD 201 is not irradiated with light, a small amount of the reverse bias current flows through a path that does not cause avalanche breakdown in the APD 201. Accordingly, the potential of the node A is considered to be 2.8 V. In this case, the source-gate voltage of the transistor 301 is 0.2 V. Since this source-gate voltage of the transistor 301 is much lower than the absolute value of its threshold voltage Vtp, the transistor 301 is completely in the OFF state.

After the reset operation of the node C, when the first photon enters the APD 201, avalanche breakdown of the APD 201 occurs, and the reverse bias voltage applied to the APD 201 drops to the breakdown voltage Vbd due to the avalanche current. The potential of the node A at this time is indicated by a potential Vb as shown in FIG. 5. When the breakdown voltage Vbd of the APD 201 is 30 V, the potential Vb=0 V. At this time, the transistor 301 is turned on, and the potential of the node C drops. However, when the source-gate voltage of the transistor 301 reaches the threshold voltage Vtp of the transistor 301, the transistor 301 is turned off, so that the potential of the node C becomes a potential (Vb+|Vtp|). In the example of the voltage (potential) relationship described above, the potential of the node C becomes 2.2 V. When the avalanche current substantially stops, the potential of the node A becomes a potential (Vb+|Vtp|−Vtn) due to the transistor 311. In the example of the voltage (potential) relationship described above, the potential of the node A becomes 2.0 V.

In this case, a voltage expressed by (Vbd+|Vtp|−Vtn) is applied to the APD 201 as the reverse bias voltage. Here, since (|Vtp|−Vtn)=Vex as has been described above, a voltage expressed by (Vbd+Vex) is applied to the APD 201 as the reverse bias voltage. That is, even when the breakdown voltage Vbd varies for each APD 201, the excess voltage Vex is a constant voltage. In the case of the voltage (potential) relationship described above, the desired voltage of 2.0 V can be applied as the excess voltage Vex. That is, when each pixel 104 includes the holding circuit 300, it is possible to apply the same excess voltage Vex to the APDs 201 of the respective pixels 104.

In this manner, when avalanche breakdown of the APD 201 occurs for the first time after the reset operation of resetting the node C serving as the holding node by the transistor 304, the holding circuit 300 holds the potential (Vb+Vtp) corresponding to the potential of the node A. When the second and subsequent photons enter in the period of one field, the potential of the node A drops to the potential Vb. However, since the transistor 301 is in the OFF state, the node C maintains the potential (Vb+Vtp) held at the time of entry of the first photon after the reset operation. That is, since the potential (Vb+Vtp) held at the time of entry of the first photon after the node C is reset is maintained, the constant excess voltage Vex is applied to the APD 201 until the next reset of the node C. In this manner, the excess voltage Vex corresponding to the difference between the absolute value of the threshold voltage of the transistor 301 and the threshold voltage of the transistor 311 is supplied to the APD 201.

To be precise, when the second and subsequent photons enter, a small amount of sub-threshold current flows through the transistor 301, so that the potential held at the node C becomes slightly lower than the potential held at the time of entry of the first photon. However, as the potential of the node C decreases, it becomes more difficult for the transistor 301 to perform an ON operation. Therefore, when a large number of photons enter, the node C practically converges to a given value. Letting a potential (Vb+|Vtp|−ΔV) be the convergence value, the threshold voltages Vtp and Vtn of the transistors 301 and 311 may be set such that the potential (|Vtp|−ΔV−Vtn) is equal to the desired excess voltage Vex. When ΔV=0.1 V, for example, Vtp=2.3 V and Vtn=0.2 V are set.

In this case, to the APD 201 of Vbd=30 V, the reverse bias voltage of 32.8 V is applied at the time of entry of the first photon after the node C is reset, so that the excess voltage Vex becomes 2.8 V. When the second photon enters, the reverse bias voltage of 32.1 V is applied, and the excess voltage Vex becomes 2.1 V. Subsequently, each time a photon enters, the excess voltage Vex gradually decreases from 2.1 V and approaches 2.0 V. In any case, the excess voltage Vex corresponding to the difference between the absolute value of the threshold voltage of the transistor 301 and the absolute value of the threshold voltage of the transistor 311 is supplied to the APD 201. In the following description, for the sake of simplification, ΔV is assumed to be negligible.

In each pixel 104, if the breakdown voltage Vbd of the APD 201 varies, the excess voltage Vex at the time of entry of the first photon after the node C is reset depends on the value of the breakdown voltage Vbd. For example, to the APD 201 of Vbd=29.5 V, the excess voltage Vex of 3.3 V is applied at the time of entry of the first photon. Similarly, to the APD 201 of Vbd=30.5 V, the excess voltage Vex of 2.3 V is applied at the time of entry of the first photon. However, in the period of one field, the value of the excess voltage Vex to be applied at the time of entry of the second and subsequent photons is the same for the APD 201 of any pixel 104, which is 2.0 V in the case of the voltage (potential) relationship described above.

The fluctuating potential of the node A at the time of entry of a photon in each pixel 104 depends on the breakdown voltage Vbd of the APD 201 arranged in each pixel 104. When the breakdown voltage Vbd is 29.5 V, the lowest potential of the node A at the time of entry of light is −0.5 V, and the lowest potential at the time of no-entry of light is 1.5 V. When the breakdown voltage Vbd is 30.5 V, the lowest potential of the node A at the time of entry of light is 0.5 V, and the lowest potential at the time of no-entry of light is 2.5 V. Therefore, in order for the waveform shaping circuit 210 to detect the avalanche current caused by the incident photon, the threshold voltage of the waveform shaping circuit 210 is set between 0.5 V and 1.5 V. In the case of the voltage relationship described above, the threshold voltage of the waveform shaping circuit 210 for detecting a photon entering the pixel 104 may be, for example, 1.0 V.

As has been described above, one control pulse 305 is input to the transistor 304 for each field, and the node C is reset. If a leakage current occurs between the source or drain of each of the transistor 301 and the transistor 304 connected to the node C and the well, the potential held at the node C changes. Hence, it is necessary to reset the node C again before the influence of the leakage current appears. In a normal semiconductor element, the reset cycle only needs to be several tens of ms, but the cycle of supplying the control pulse 305 may be decided, as appropriate, in accordance with the characteristics of the transistors 301 and 304.

When operating the photoelectric conversion apparatus 100, it is necessary to set the excess voltage Vex so that all the APDs 201 arranged in the pixels 104 cause avalanche breakdown in accordance with entry of a photon. In this case, due to the variation in the breakdown voltage Vbd of the APD 201, the excessive excess voltage Vex is applied to the APD 201 having the small breakdown voltage Vbd. When the excessive excess voltage Vex is applied, the energy required for signal detection increases, and the power consumption of the entire photoelectric conversion apparatus 100 increases. Further, when the excessive excess voltage Vex is applied, the light emission amount at the time of avalanche breakdown increases, and crosstalk increases. Furthermore, when the excessive excess voltage Vex is applied, the characteristics of the APD 201 degrade faster, so that reliability decreases. In addition, since the dark current of the APD 201 increases, noise may increase. In addition, if the excess voltage Vex applied to the APD 201 of each pixel 104 varies, the probability of occurrence of avalanche breakdown caused by entry of a photon varies, and the sensitivity of each pixel 104 varies.

On the other hand, as has been described above, the holding circuit 300 having a simple circuit arrangement is arranged in the pixel 104 of the photoelectric conversion apparatus 100 according to this embodiment. The holding circuit 300 is formed from only two transistors 301 and 304 when the parasitic capacitance is used for the hold capacitor 306 as has been described above. This is much smaller in circuit scale than the signal processing unit and the bias regulation unit described in Japanese Patent Laid-Open No. 2021-089962. With the holding circuit 300, the excess voltage Vex varies only when the first photon enters after the node C is reset, but the desired excess voltage Vex is applied to the APD 201 of each pixel 104 when detecting the second and subsequent incident photons. That is, the holding circuit 300 according to this embodiment can implement the photoelectric conversion apparatus 100 that includes a SPAD element having excellent characteristics such as low power consumption, small crosstalk, high reliability, a small dark current, and small sensitivity variation.

Figure 6:
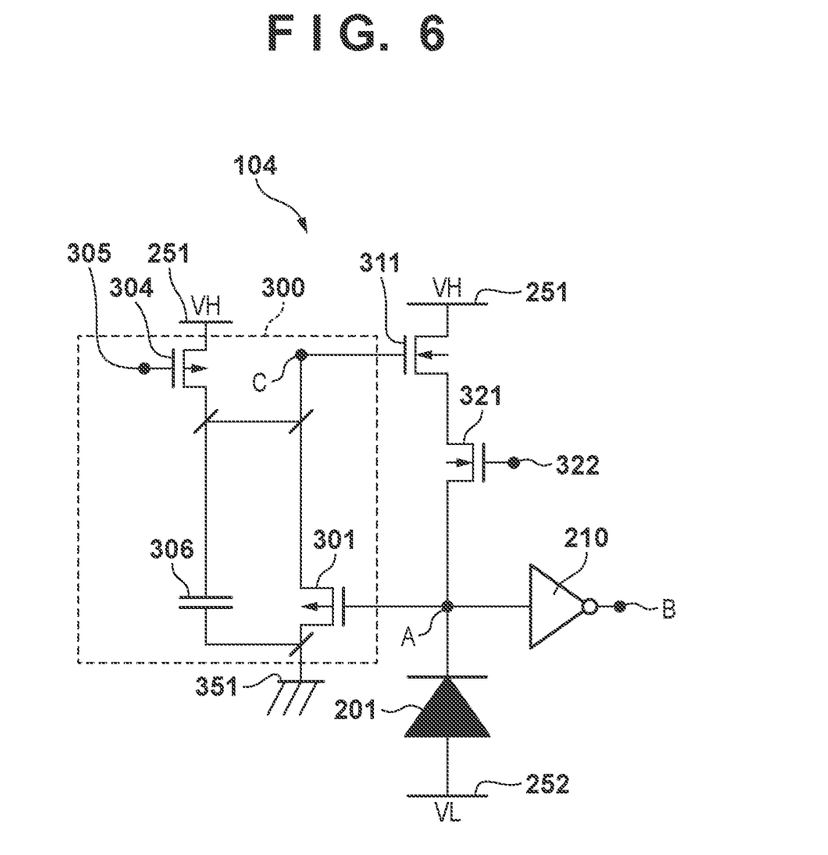
FIG. 6 is an equivalent circuit diagram showing a modification of the pixel shown in FIG. 4.

FIG. 6 is an equivalent circuit diagram showing an arrangement example of a pixel 104 of a photoelectric conversion apparatus 100 according to the second embodiment of the present disclosure. As compared to the arrangement of the pixel 104 shown in FIG. 4, a transistor 321 is arranged so as to form a current path between a transistor 311 and an APD 201. The transistor 321 is an n-type MOS transistor. The transistor 321 operates in accordance with a control pulse 322 input to the gate. The control pulse 322 may be supplied from a vertical scanning circuit 110, or a control circuit that supplies the control pulse 322 may be arranged in the photoelectric conversion apparatus 100. Although not shown in FIG. 6, a quenching element 202 may be arranged between the transistor 321 and the APD 201 as in the first embodiment described above.

Figure 7:
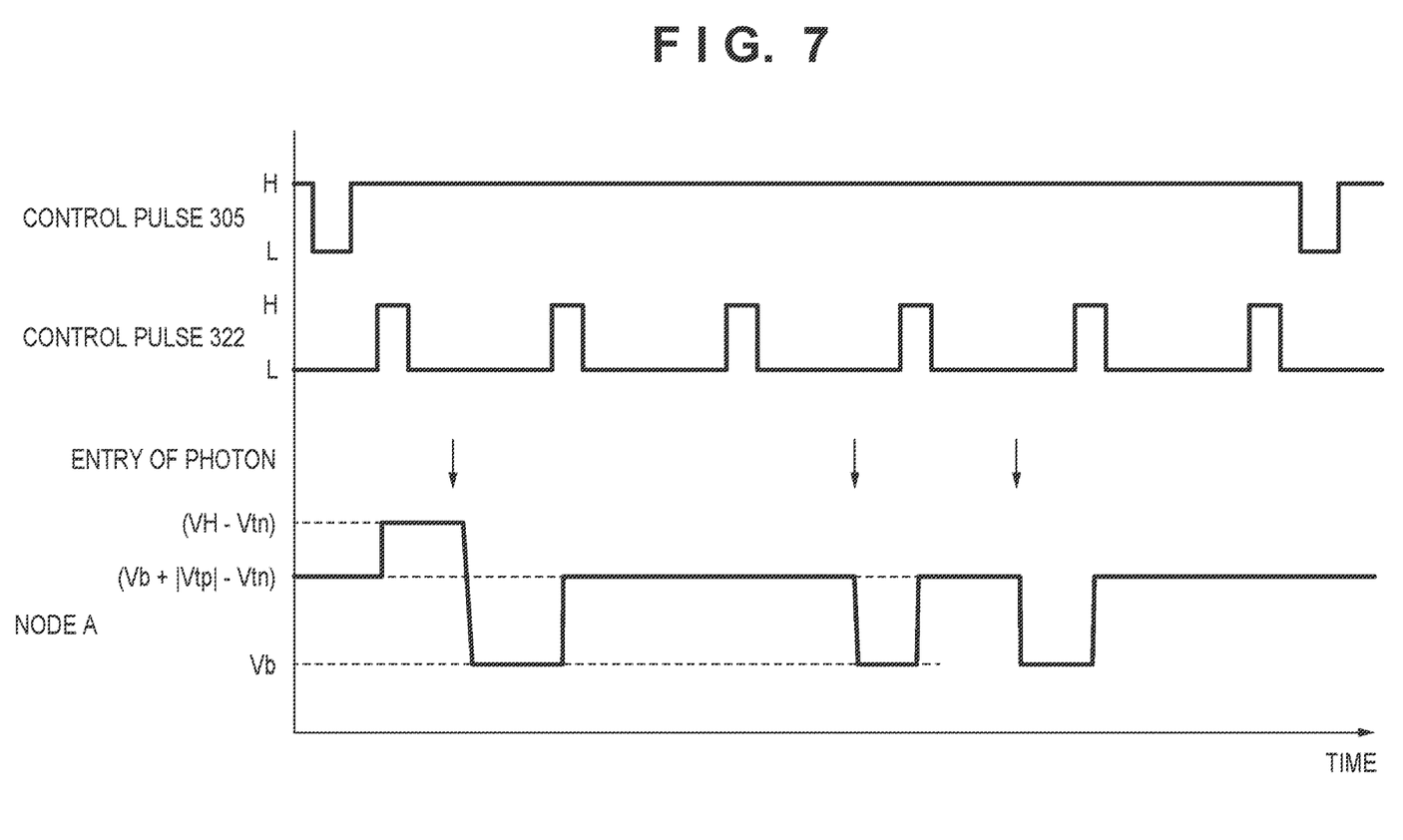
FIG. 7 is a timing chart showing an operation example of the pixel shown in FIG. 6.

FIG. 7 is a timing chart for explaining the operation of the pixel 104 shown in FIG. 6. FIG. 7 shows the waveform change of a control pulse 305 input to the gate of a transistor 304, the waveform change of the control pulse 322 input to the gate of the transistor 321, and the waveform change of a node A. In FIG. 7, the timing at which a photon enters the APD 201 is indicated by "↓" as in FIG. 5.

In the operation shown in FIG. 7, photon counting is controlled by the control pulse 322. When the control pulse 322 is input (in FIG. 7, the control pulse 322 is set at H level), the transistor 321 is turned on. Accordingly, when the control pulse 322 is at H level, the node A is set in the initial state. When the control pulse 322 is changed to L level, the transistor 321 is turned off and the node A is set in a floating state. When a photon enters the APD 201 while the node A is in the floating state, the APD 201 causes avalanche breakdown, and the potential of the node A drops to a potential Vb. In this state, when the control pulse 322 is input, the potential of the node A is set in the initial state again. A plurality of the control pulses 322 are applied to the gate of the transistor 321 during the period of one field in which the control pulse 305 is input to the transistor 304. That is, as shown in FIG. 7, the transistor 321 intermittently repeats an ON operation, and the interval at which the transistor 321 repeats the ON operation is shorter than the interval at which the transistor 304 performs an ON operation to reset a node C serving as a holding node.

The potential of the node C immediately after the control pulse 305 is input to the gate of the transistor 304 and the node C of a holding circuit 300 is reset is voltage VH as has been described above. When no photon enters, the potential of the node A is set to a potential (VH−Vtn) by the first control pulse 322 after the node C of the holding circuit 300 is reset. Then, when the first photon enters after the node A is set to the potential (VH−Vtn), the potential of the node A drops to a potential Vb, and the node C holds a potential (Vb+|Vtp|) at this time. Thereafter, as has been described above, the potential of the node C remains at the potential (Vb+|Vtp|) until the next control pulse 305 is input. Therefore, when the second and subsequent photons enter, an excess voltage Vex applied to the APD 201 becomes the desired voltage such as 2.0 V as has been described above.

In the operation shown in FIG. 7, the number of incident photons is counted as 1 whether only one photon enters the APD 201 or a plurality of photons enter the APD 201 between two control pulses 322. Therefore, the number of detected incident photons is equal to or smaller than the number of the control pulses 322. However, consider a case in which very strong light enters, in other words, a large number of photons enter in a short period of time. In this case, in the operation according to the first embodiment shown in FIG. 5, the potential of the node A may remain the potential Vb so the count does not proceed, that is, pile-up may occur, and the number of photons entering the APD 201 cannot be counted. On the other hand, in the operation according to this embodiment shown in FIG. 7, even when a large number of photons enter in a short period of time, the number of photons can be counted at least as many times as the control pulses 322 are input. In addition, in the operation according to the first embodiment, the potential of the node A instantaneously becomes the potential Vb as shown in FIG. 5 except for a case of a pile-up state. Therefore, in some cases, it is difficult in terms of time to lower the potential of the node C to the potential (Vb+|Vtp|) reflecting the potential Vb. On the other hand, in the operation according to this embodiment, the potential of the node A continues to be the potential Vb until the control pulse 322 is input after the photon enters. Since the time during which the node A is at the potential Vb increases, the potential of the node C can be sufficiently lowered to the potential (Vb+Vtp).

Also in this embodiment, as in the first embodiment, the excess voltage Vex varies only when the first photon enters after the node C is reset, but the desired excess voltage Vex is applied to the APD 201 of each pixel 104 when detecting the second and subsequent incident photons. Therefore, the photoelectric conversion apparatus 100 including the pixels 104 according to this embodiment can obtain effects similar to those in the first embodiment described above. In addition, as compared to the first embodiment described above, it is possible to implement the photoelectric conversion apparatus 100 including the SPAD element which is excellent in the characteristic that hardly causes pile-up.

Figure 8:
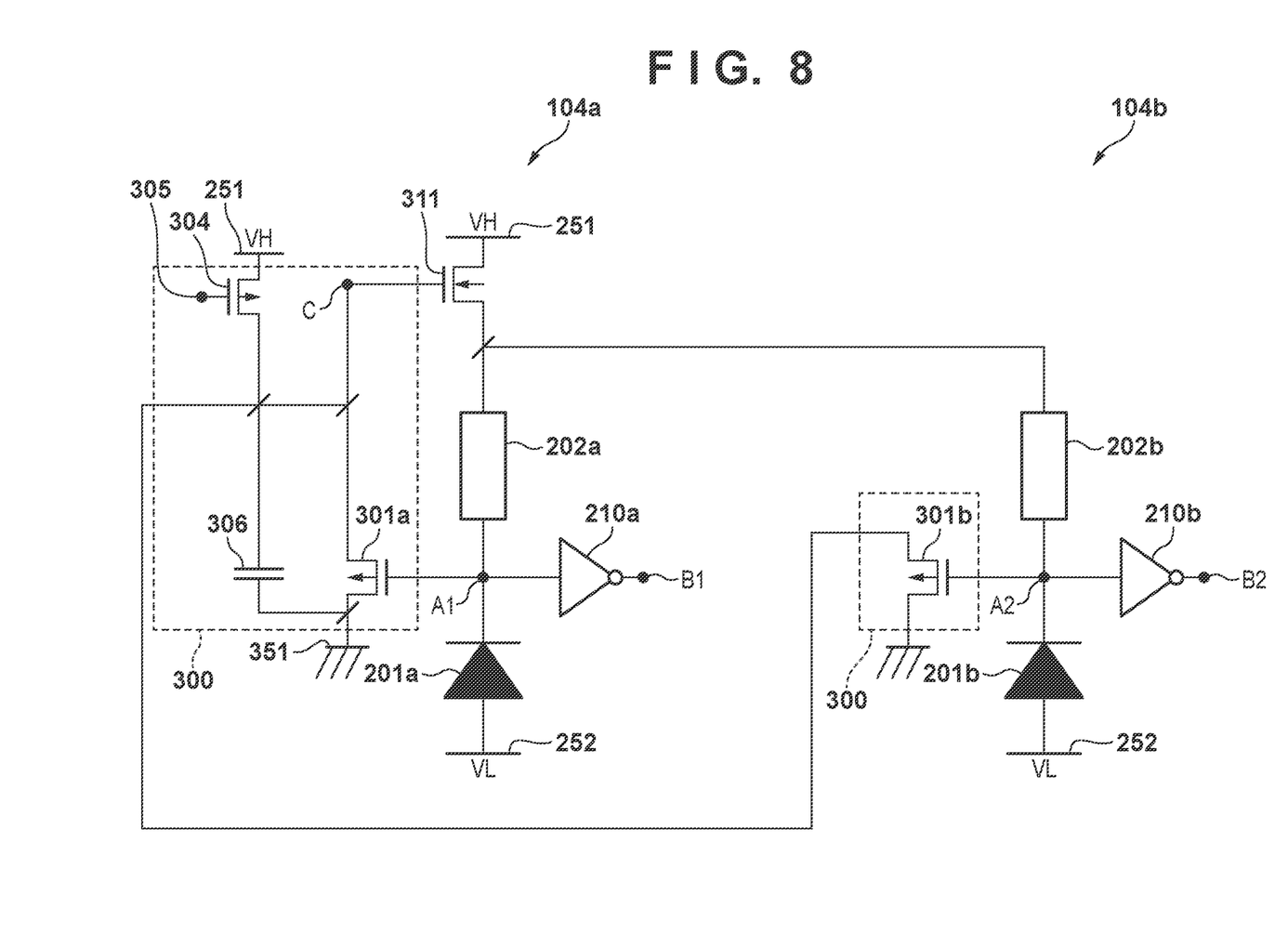
FIG. 8 is an equivalent circuit diagram showing another modification of the pixel shown in FIG. 4.

FIG. 8 is an equivalent circuit diagram showing an arrangement example of a pixel 104 of a photoelectric conversion apparatus 100 according to the third embodiment of the present disclosure. In the first and second embodiments described above, a case has been described in which respective components of the holding circuit 300 are arranged in each of the plurality of pixels 104. On the other hand, in the pixel shown in FIG. 8, a transistor 311 and a transistor 304 are shared by two pixels 104*a* and 104*b*. Similarly, a node C and a hold capacitor 306 are shared by the pixels 104*a* and 104*b*. On the other hand, a transistor 301 of a holding circuit 300 is arranged in each of the pixels 104*a* and 104*b* (transistors 301*a* and 301*b*). An APD 201, a quenching element 202, and a waveform shaping circuit 210 are arranged in each pixel 104. Here, it will be described that the two pixels 104a and 104b share the transistors 311 and 304 and the like, but three or more pixels 104 may share the transistors 311 and 304 and the like. For example, four pixels 104 may share the transistors 311 and 304 and the like. Since the transistors 304 and 311 and the like are shared by two or more pixels 104, the number of components required per one pixel 104 (pixel unit 101) decreases. Therefore, even if the pixel size is relatively small, the effect of the holding circuit 300 described above can be implemented. Although not shown in FIG. 8, a count circuit 211 and the like of a signal processing circuit 103 may be shared by the two or more pixels 104 as has been described above.

In the arrangement shown in FIG. 8, a potential (Vb+|Vtp|) of the pixel having a lower breakdown voltage Vbd between the two pixels 104a and 104b is reflected on the potential held at the node C. An excess voltage Vex lower than the desired excess voltage Vex is applied to the pixel having the higher breakdown voltage Vbd between the two pixels 104a and 104b. However, the variation in the breakdown voltage Vbd of the APD 201 may be small between the APDs 201 physically close to each other and large between the APDs 201 physically far from each other. Therefore, if two or more pixels 104 sharing the node C are adjacent (for example, adjacent to each other) pixels 104, the APD 201 of each pixel 104 is applied with the desired excess voltage Vex.

Also, in the operations shown in the first and second embodiments, it has been described that when the first photon enters after the reset operation of the node C, the excess voltage Vex different from the desired excess voltage Vex is applied to all the pixels 104. On the other hand, in this embodiment, the excess voltage Vex different from the desired excess voltage Vex is applied to the pixel to which a photon first enters after the reset operation of the node C among the plurality of pixels 104 (to be sometimes referred to as sharing pixels, hereinafter) sharing the transistors 304 and 311 and the like. However, at this time, the potential of the node C shared by the sharing pixels becomes the potential (Vb+|Vtp|). Accordingly, the pixels other than the pixel to which the photon first enters among the sharing pixels operate while being applied with the desired excess voltage Vex from the time of entry of the first photon.

In this embodiment, the transistors 304 and 311 and the like are shared by the plurality of pixels 104 (sharing pixels). Among the sharing pixels, only the pixel 104 to which a photon first entered after the node C is reset does not have the desired value of the excess voltage Vex. However, when detecting subsequent incident photons, the desired excess voltage Vex is supplied to all of the APDs 201 of the sharing pixels. Therefore, the photoelectric conversion apparatus 100 according to this embodiment can obtain an effect similar to those in the first and second embodiments described above. Further, since the sharing pixels share the transistors 304 and 311 and the like, the holding circuit 300 can be incorporated in the pixel 104 even when the size of the pixel 104 is small. In this manner, also in this embodiment, the photoelectric conversion apparatus 100 including the SPAD element with excellent characteristics can be implemented.

Figure 9:
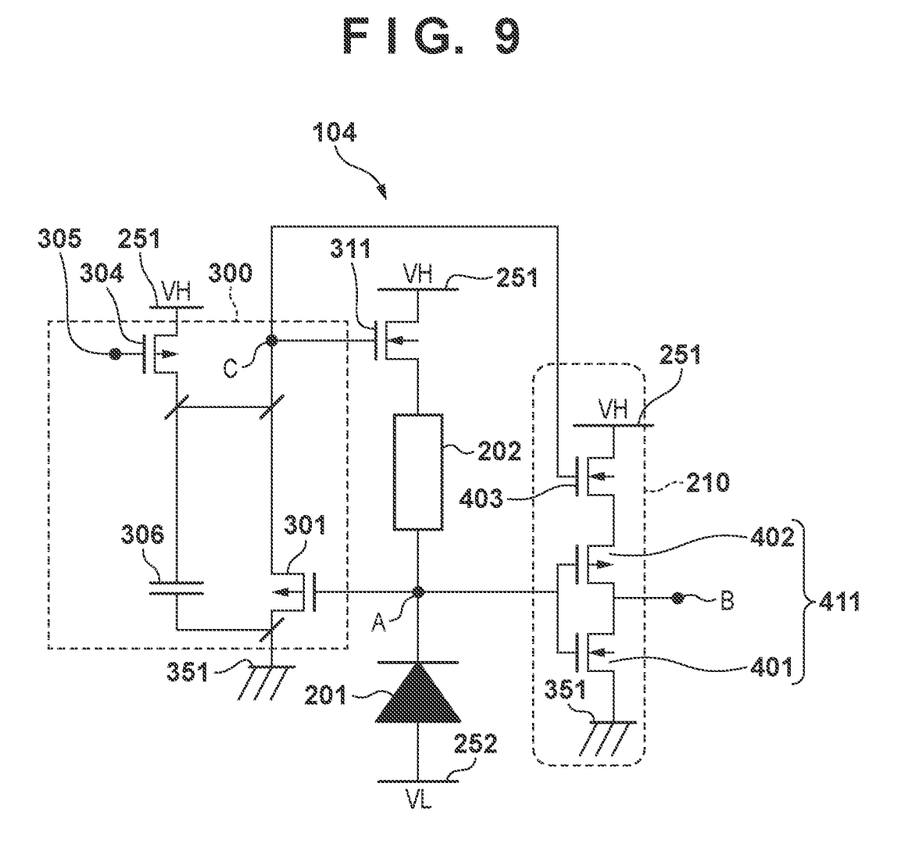
FIG. 9 is an equivalent circuit diagram showing still another modification of the pixel shown in FIG. 4.

FIG. 9 is an equivalent circuit diagram showing an arrangement example of a pixel 104 of a photoelectric conversion apparatus 100 according to the fourth embodiment of the present disclosure. In the first to third embodiments described above, it has been described that the inverter is used as the waveform shaping circuit 210, but here, the details of a waveform shaping circuit 210 will be described below.

As shown in FIG. 9, the waveform shaping circuit 210 of this embodiment includes a transistor 401 which is an n-type MOS transistor, a transistor 402 which is a p-type MOS transistor, and a transistor 403 which is an n-type MOS transistor. The transistor 401 and the transistor 402 form an inverter 411 that receives the potential of the node A connected to the cathode of the APD 201 and outputs a signal based on the potential of the node A to a node B. The transistor 403 is arranged so as to form a current path between the inverter 411 and a potential supply line 251. More specifically, the source of the transistor 402 forming the inverter 411 and the potential supply line 251 which supplies a voltage VH are connected via the transistor 403. The gate of the transistor 403 is connected to a node C, and the above-described potential corresponding to the potential of the node A is supplied from a holding circuit 300. The source of the transistor 401 is connected to a potential supply line 351.

In the first to third embodiments described above, the potential fluctuation range of the node A depends on the breakdown voltage Vbd of each APD 201. In the voltage (potential) relationship described above, when Vbd=30 V, the potential fluctuation range of the node A is 2.8 V to 0.0 V at the time of entry of the first photon, and 2.0 V to 0.0 V at the time of entry of the second and subsequent photons. When Vbd=30.5 V, the potential fluctuation range of the node A is 2.8 V to 0.5 V at the time of entry of the first photon, and 2.5 V to 0.5 V at the time of entry of the second and subsequent photons. When Vbd=29.5 V, the potential fluctuation range of the node A is 2.8 V to −0.5 V at the time of entry of the first photon, and 1.5 V to −0.5 V at the time of entry of the second and subsequent photons. Hence, it has been described that the waveform shaping circuit 210 is the inverter, and the threshold voltage at which the waveform shaping circuit 210, which is configured to detect a photon entering the APD 201, outputs a signal to the node B is set to 1.0 V.

However, two problems can occur in the waveform shaping circuit 210 used as a signal detection circuit. One problem is that, when the second and subsequent photons enter after the reset operation of the node C, the margin of the potential fluctuation range is as small as 0.5 V with respect to the threshold voltage of the inverter. In the above-described potential fluctuation ranges, 1.0 V is included in all the potential fluctuation ranges. Therefore, the waveform shaping circuit 210 detects an avalanche current. However, the breakdown voltage Vbd of the APD 201 may vary more than ±0.5 V, the threshold voltage of the inverter itself may vary, or the threshold voltage of the inverter may fluctuate depending on the temperature. Considering these cases, 0.5 V may be insufficient for the margin of the potential fluctuation range with respect to the threshold voltage of the inverter.

The next possible problem is a through current. As compared to the waveform shaping circuit 210 shown in FIG. 9, a general inverter is formed from the transistors 401 and 402 (inverter 411) and the transistor 403 is not arranged. The threshold voltage of each of the transistors 401 and 402 forming the inverter 411 can be set to about 0.6 V when the power supply voltage is about 3 V. Although the threshold voltage value of a p-type MOS transistor is generally negative, it is expressed here by an absolute value. In practice, the threshold voltage of the transistor 402 is −0.6 V. The potential fluctuation range of the node A is 2.0 V to 0.0 V at the time of entry of the second and subsequent photons for the pixel 104 (average pixel 104) including the APD 201 of Vbd=30 V, and 1.5 V to −0.5 V for the pixel 104 including the APD 201 of Vbd=29.5 V. In this case, since the potential of the node A while waiting for entry of the second and subsequent photons is 2.0 V on average and 1.5 V at the minimum, a through current flows through the inverter 411. The reason for this is as follows. The transistor 401, which is an n-type MOS transistor that forms the general inverter 411, is turned on when the gate potential is 0.6 V or higher. In addition, as has been described above, when VH=3.0 V, the transistor 402, which is a p-type MOS transistor, is turned on when the gate potential is 2.4 V or lower. Accordingly, both the n-type transistor 401 and the p-type transistor 402 are turned on. In order to prevent the through current, the threshold voltage of the transistor 402 as the p-type MOS transistor should be 1.5 V or higher. However, increasing the threshold voltage of the transistor 402 impairs the driving power and response speed of the inverter 411.

To address these possible problems, the waveform shaping circuit 210 including the transistor 403 is arranged as shown in FIG. 9. The operation of the waveform shaping circuit 210 including the transistor 403 will be described below.

Here, the threshold voltage of the transistor 401 is 0.6 V, which is a general value. Similarly, the threshold voltage of the transistor 402 is also 0.6 V. The threshold voltage of the transistor 403 is 0.2 V equal to the threshold voltage of a transistor 311 which is also an n-type MOS transistor. As in each embodiment described above, the voltage VH supplied to the potential supply line 251 is 3.0 V. The source potential of the transistor 403 serves as the power supply potential of the inverter 411 formed from the transistors 401 and 402, which is the value lower than the potential of the node C by 0.2 V.

The threshold voltage of the inverter 411 formed from the transistor 401 and the transistor 402 is assumed to be ½ of the power supply potential. Therefore, for the pixel 104 provided with the APD 201 of Vbd=30 V, the threshold voltage of the waveform shaping circuit 210 changes as follows:
(1) after the reset operation of the node C, until the first photon enters
threshold voltage=2.8 V/2=1.4 V
(2) after the first photon enters
threshold voltage=2.0 V/2=1.0 V Since the potential fluctuation range of the node A at the time of entry of the first photon is 2.8 V to 0 V, there is the sufficient margin of 1.4 V with respect to the threshold voltage of the waveform shaping circuit 210 (inverter 411). Further, since the potential fluctuation range of the node A at the time of entry of the second and subsequent photons is 2.0 V to 0 V, the margin with respect to the threshold voltage of the waveform shaping circuit 210 is 1.0 V.

Next, the threshold voltage of the waveform shaping circuit 210 of the pixel 104 provided with the APD 201 of Vbd=30.5 V changes as follows:
(1) after the node C is reset, until the first photon enters
threshold voltage=2.8 V/2=1.4 V
(2) after the first photon enters
threshold voltage=2.5 V/2=1.25 V Since the potential fluctuation range of the node A at the time of entry of the second and subsequent photons is 2.5 V to 0.5 V, the margin with respect to the threshold voltage of the waveform shaping circuit 210 is 0.75 V. Similarly, the margin with respect to the threshold voltage of the waveform shaping circuit 210 of the pixel 104 provided with the APD 201 of Vbd=29.5 V is 0.75 V.

As has been described above, the minimum margin of the potential fluctuation range of the node A with respect to the threshold voltage of the waveform shaping circuit 210 is 0.75 V. As compared to the margin of 0.5 V in the above-described case in which the threshold voltage of the waveform shaping circuit 210 is fixed at 1.0 V, the margin is increased by 1.5 times. Further, as can be seen from the example described above, there is no concern about the through current.

In this manner, the characteristic (circuit parameter) of the waveform shaping circuit 210 (for example, inverter 411) changes in accordance with the potential held at the node C and reflecting the breakdown voltage Vbd of the APD 201 of each pixel 104. The characteristic of the waveform shaping circuit 210 is the threshold voltage at which the waveform shaping circuit 210 outputs a signal with respect to the potential of the node A connected to the cathode of the APD 201. With this, the operation margin of the waveform shaping circuit 210 can be ensured.

In the arrangement shown in FIG. 9, the waveform shaping circuit 210 of this embodiment is added to the pixel 104 having the arrangement shown in FIG. 4 according to the first embodiment. However, the present invention is not limited to this, and the waveform shaping circuit 210 of this embodiment can also be applied to the pixel 104 having the arrangement shown in each of FIGS. 6 and 8 described in the second and third embodiments, respectively.

According to this embodiment, not only the effects in the above-described first to third embodiments can be obtained, but also the operation margin of the waveform shaping circuit 210 functioning as a signal detection circuit for detecting a photon entering the APD 201 is increased. In addition, the concern about the through current is suppressed. That is, an SPAD element including a signal detection circuit that can be stably used can be implemented. As a result, the reliability of the photoelectric conversion apparatus 100 improves.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-103904, filed Jun. 28, 2022, which is hereby incorporated by reference herein in its entirety.

What is claimed is:
1. A photoelectric conversion apparatus in which a plurality of pixels are arranged, wherein
each of the plurality of pixels comprises:
an avalanche photodiode arranged between a first potential supply line and a second potential supply line;
a first transistor arranged so as to form a current path between the first potential supply line and the avalanche photodiode; and
a holding circuit configured to, when avalanche breakdown of the avalanche photodiode has occurred, hold a second potential corresponding a first potential of an electrode of the avalanche photodiode connected to the first transistor, and
the second potential is supplied to a gate of the first transistor from the holding circuit.
2. The apparatus according to claim 1, wherein
the holding circuit comprises: a holding node configured to hold the second potential and connected to the gate of the first transistor; a second transistor configured to reset the holding node; and a third transistor arranged so as to form a current path between the holding node and a third potential supply line and having a gate connected to the electrode.

3. The apparatus according to claim 2, wherein when avalanche breakdown of the avalanche photodiode occurs for the first time after a reset operation of resetting the holding node by the second transistor, the holding circuit holds the second potential.

4. The apparatus according to claim 2, wherein the second transistor is arranged so as to form a current path between the first potential supply line and the holding node.

5. The apparatus according to claim 2, wherein an excess voltage corresponding to a difference between a threshold voltage of the first transistor and an absolute value of a threshold voltage of the third transistor is supplied to the avalanche photodiode.

6. The apparatus according to claim 5, wherein the first transistor is an n-type MOS transistor, and the third transistor is a p-type MOS transistor.

7. The apparatus according to claim 2, wherein the first transistor and the second transistor are shared by not less than two pixels of the plurality of pixels, and the third transistor is arranged in each of the plurality of pixels.

8. The apparatus according to claim 2, wherein a fourth transistor is arranged so as to form a current path between the first transistor and the avalanche photodiode,
the fourth transistor intermittently repeats an ON operation, and
an interval at which the fourth transistor repeats the ON operation is shorter than an interval at which the second transistor performs an ON operation to reset the holding node.

9. The apparatus according to claim 1, wherein a fourth transistor is arranged so as to form a current path between the first transistor and the avalanche photodiode.

10. The apparatus according to claim 1, wherein a quenching element is arranged between the first transistor and the avalanche photodiode.

11. The apparatus according to claim 1, wherein each of the plurality of pixels further comprises a waveform shaping circuit connected to the electrode and configured to output a signal based on a potential of the electrode.

12. The apparatus according to claim 11, wherein a characteristic of the waveform shaping circuit changes in accordance with the second potential.

13. The apparatus according to claim 12, wherein the characteristic is a threshold voltage at which the waveform shaping circuit outputs a signal with respect to the potential of the electrode.

14. The apparatus according to claim 11, wherein the waveform shaping circuit comprises: an inverter configured to receive the potential of the electrode and output a signal based on the potential of the electrode; and a fifth transistor arranged so as to form a current path between the inverter and the first potential supply line, and
the second potential is supplied to a gate of the fifth transistor.

15. The apparatus according to claim 11, wherein each of the plurality of pixels further comprises a count circuit configured to count the number of times the waveform shaping circuit outputs a signal.

* * * * *